United States Patent [19]

Allsop et al.

[11] Patent Number: 4,889,985
[45] Date of Patent: Dec. 26, 1989

[54] COMBINED OPTICAL POWER METER AND RECEIVER

[75] Inventors: Bryan E. Allsop, Hertfordshire; Allen W. Mabbitt, Bedford, both of England; Kevin K. Smith, West Linn, Oreg.

[73] Assignee: Tektronix, Inc., Beaverton, Oreg.

[21] Appl. No.: 262,759

[22] Filed: Oct. 26, 1988

[51] Int. Cl.$^4$ .............................................. H01J 40/14
[52] U.S. Cl. .......................... 250/214 A; 250/214 AG
[58] Field of Search ....... 250/214 A, 214 R, 214 AG; 330/277, 311; 356/224, 226, 213, 215, 218

[56] References Cited

U.S. PATENT DOCUMENTS

| | | | |
|---|---|---|---|
| 4,236,069 | 11/1980 | Laughlin | 250/214 R |
| 4,415,803 | 11/1983 | Muoi | 250/214 AG |
| 4,420,724 | 12/1983 | Owen | 330/277 |
| 4,498,001 | 2/1985 | Smoot | 250/214 A |
| 4,764,732 | 8/1988 | Dion | 250/214 A |

OTHER PUBLICATIONS

Hewlett-Packard Journal, pp. 18-26, Jan. 1985, "A Versatile, Programmable Optical Pulse Power Meter", (Werner Berkel, Hans Huning, Volker Eberle, Josef Becker, Bernd Maisenbacher, Wilfried Pless, and Michael Goder).

*Primary Examiner*—David C. Nelms
*Assistant Examiner*—William L. Oen
*Attorney, Agent, or Firm*—Peter J. Meza

[57] ABSTRACT

A combined optical power meter and receiver is provided in which the optical power meter retains high sensitivity and the optical receiver retains high bandwidth. A single photodiode provides current for both the optical power meter and the optical receiver. A first operational amplifier is configured as an integrating transimpedance amplifier having a current input which is referenced to a reference voltage and receives current from one port of the photodiode. A second operational amplifier is configured as a transimpedance amplifier having a current input which is referenced to ground and receives current from the other port of the photodiode. In this manner, a bias voltage is developed across the photodiode to decrease the capacitance and increase the operational speed of the receiver. A second material photodiode is provided which is shielded from the input light source is coupled to the current input of the first transimpedance amplifier. The polarity of the second photodiode is such that a path exists for the leakage current of the first photodiode, which decreases the sensitivity of the optical power meter to thermal variations in leakage current.

4 Claims, 1 Drawing Sheet

COMBINED OPTICAL POWER METER AND RECEIVER

BACKGROUND OF THE INVENTION

This invention relates to optical power meters and optical receivers and more particularly to optical power meters and receivers which are combined for simultaneous operation.

Most prior art optical power meters use a single photodiode in combination with an integrating transimpedance amplifier to provide an output voltage which is representative of the average input optical power. Such optical power meters are characterized by high sensitivity and low bandwidth. Similarly, most prior art optical receivers use a single photodiode in combination with a transimpedance amplifier to provide a voltage output which is representative of the instantaneous current through the photodiode. Such optical receivers are characterized by lower sensitivity and high bandwidth.

A prior art optical power meter is shown in FIG. 1. The optical power meter 10 consists of an operational amplifier 18 in which resistors 12 and 24 form current summing inputs at the positive and negative inputs of operational amplifier 18. Oftentimes resistors 12 and 24 are actually several resistors in parallel which are switched into the circuit to provide alternative gain modes. The input current is provided by photodiode 16 in response to an external light source. Integrating capacitors 14 and 22 integrate the output voltage which is provided at terminal 20 and is representative of the average input optical power. The prior art optical power meter of FIG. 1 does not apply any bias voltage across photodiode 16. In the zero bias condition, photodiode 16 has the greatest sensitivity since minimal leakage (also known as "dark" current) is produced. However, in the zero bias condition, the capacitance of the photodiode 16 is relatively large compared with the capacitance in the reverse biased condition. This, in conjunction with the integrating capacitors 14 and 22, limits the effective bandwidth of the optical power meter 10.

A prior art optical receiver is shown in FIG. 2. The optical receiver 26 consists of an operational amplifier 38 in which resistor 34 forms a current input at the negative input of operational amplifier 38. The input current is provided by photodiode 32 in response to an external light source. A reference voltage, $V_{REF}$, is provided to apply a bias voltage across photodiode 32. A small value resistor 28 and a small value capacitor 30 provide a slight frequency compensation which filters out high frequency transients. An output voltage is produced at terminal 36 which is representative of the instantaneous current through photodiode 32. The prior art optical receiver of FIG. 2 maintains a bias voltage of approximately $V_{REF}$ across photodiode 32. In the biased condition, photodiode 32 has reduced capacitance, since junction capacitance is a function of voltage. However, in the biased condition, a leakage or dark current is produced and is shown as $I_L$. While the frequency response of the optical receiver shown in FIG. 2 is improved over that of the optical power meter of FIG. 1, the sensitivity is diminished. The diminished sensitivity is due to the shot noise which is associated with the leakage current, $I_L$, the reduced value of resistor 34, necessary for high speed operation, and the nature of operational amplifier 38 which is maximized for speed and not sensitivity, and therefore has high input bias currents.

Attempts to combine the two prior art circuits have in the past produced circuits in which either the optical power meter suffers from reduced sensitivity or the optical receiver suffers from reduced bandwidth, or both. What is desired is a circuit having a minimum of components which combines an optical power meter and receiver for simultaneous operation in such manner that the high sensitivity of the optical power meter and high bandwidth of the optical receiver are both retained.

SUMMARY OF THE INVENTION

In accordance with the present invention, a combined optical power meter and receiver is provided in which the optical power meter retains high sensitivity and the optical receiver retains high bandwidth.

In a preferred embodiment of the present invention, a single photodiode provides current for both the optical power meter and the optical receiver. A first operational amplifier is configured as an integrating transimpedance amplifier having a current input which is referenced to a reference voltage and receives current from one port of the photodiode. A second operational amplifier is configured as a transimpedance amplifier having a current input which is referenced to ground and receives current from the other port of the photodiode. In this manner, a bias voltage is developed across the photodiode to decrease the capacitance and increase the operational speed of the receiver. A second matched photodiode is provided which is shielded from the input light source and is coupled to the current input of the first transimpedance amplifier. The polarity of the second photodiode is such that a path exists for the leakage current of the first photodiode, which in turn decreases the sensitivity of the optical power meter to thermal variations in leakage current.

BRIEF DESCRIPTION OF THE DRAWING

For a better understanding of the invention, and to show how the same may be carried into effect, reference will now be made to the accompanying drawings, in which.

DESCRIPTION OF THE PREFERRED EMBODIMENT

Figure 1:
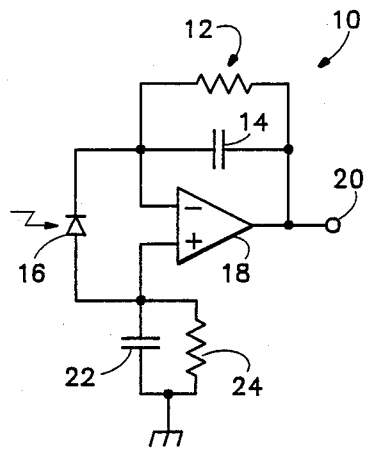
FIG. 1 is a schematic diagram of a prior art optical power meter.
Figure 2:
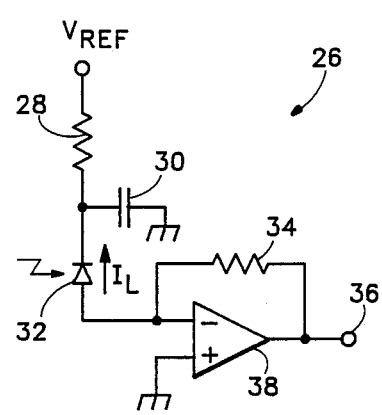
FIG. 2 is a schematic diagram of a prior art optical receiver.
Figure 3:
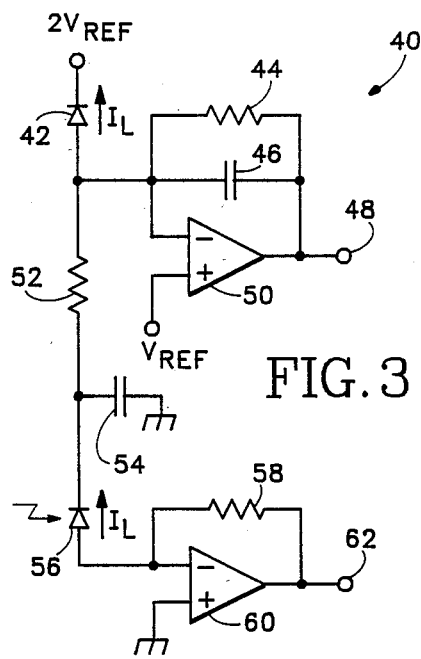
FIG. 3 is a schematic diagram of a combined optical power meter and receiver in accordance with the present invention.

A combined optical power meter and receiver 40 is illustrated in FIG. 3. The optical power meter consists of operational amplifier 50 in which resistor 44 forms the current summing input at the negative input of operational amplifier 50. Resistor 44 may actually be several resistors in parallel which are switched into the circuit to provide alternative gain modes. The input current is provided by the current flowing in the cathode of photodiode 56 in response to an external light source. Integrating capacitor 46 integrates the output voltage which is provided at terminal 48 and is representative of the average input optical power. The positive input of operational amplifier 50 is coupled to a source of reference voltage designated $V_{REF}$. This voltage appears at the current input of the amplifier and forces one end of the photodiode to be biased to $V_{REF}$.

An optical receiver consists of an operational amplifier 60 in which resistor 58 forms a current input at the negative input of operational amplifier 60. The input current is provided by the anode current of the same photodiode 56 in response to an external light source. The positive input of operational amplifier 60 is coupled to ground. This ground potential appears at the current input of the amplifier, thus producing a net voltage, $V_{REF}$, across photodiode 56. A small value resistor 52 and a small value capacitor 54 provide a slight frequency compensation which filters out high frequency transients. An output voltage is produced at terminal 62 which is representative of the instantaneous current through photodiode 56.

Since a bias voltage of approximately $V_{REF}$ is placed across photodiode 56, its junction capacitance is reduced. However, in this biased condition, the leakage current, $I_L$, must be cancelled or the current flows into the current input of the optical power meter. In turn, this current produces a dark or leakage current signal which causes offset and thermal drift in the optical power meter. Therefore a second matched photodiode 42 is provided which is shielded from the input light source and is coupled between the current input of operational amplifier 50 and a second reference voltage. The value of the second reference voltage is equal to twice the value of $V_{REF}$. The polarity of the diode is determined by the direction of leakage current through each photodiode. As shown in FIG. 3, both diodes produce a leakage current which flows in the same direction. Thus, the leakage currents cancel at the current input of the optical power meter, and no dark or leakage current signal is produced. Coupling the second photodiode 42 to twice the value of $V_{REF}$ ensures that the bias voltage across each photodiode is the same, which in turn ensures that the magnitude of the leakage current in each photodiode is the same and will approximately cancel as the temperature varies.

Thus it has been shown that the present invention is a combined optical power meter and receiver in which a single photodiode provides current for both the optical power meter and the optical receiver. The photodiode is biased in such a manner that the speed of the optical receiver is maximized, and a leakage current compensation means is provided which minimizes the effect of leakage currents as a function of temperature in the optical power meter.

It will be appreciated that the present invention is not restricted to the particular embodiment that has been described, and that variations may be made therein without departing from the scope of the invention as defined in the appended claims and equivalents thereof. For example the combination of resistor 44 and operational amplifier 50, and resistor 58 and operational amplifier 60 may be replaced by any conventional transimpedance amplifier. Further, resistors 44 and 58 may be parallel combinations of different resistors which are selectively switched to provide alternative gain modes.

I claim:

1. A combined optical power meter and receiver comprising:
   (a) a first slow transimpedance amplifier having a current input referenced to a first reference voltage, and a voltage output;
   (b) a second fast transimpedance amplifier having a current input referenced to a second reference voltage, and a voltage output;
   (c) a first photodiode having an anode and a cathode coupled between the current input of said first slow transimpedance amplifier and the current input of said slow transimpedance amplifier, the voltage output of the first slow transimpedance amplifier representing the average input optical power dissipated by the first photodiode and the voltage output of the second fast transimpedance amplifier simultaneously representing the instantaneous current flowing through the first photodiode.

2. A combined optical power meter and receiver as in claim 1 further comprising a second photodiode having an anode and a cathode coupled between the current input of said first slow transimpedance amplifier and a third reference voltage source, the polarity of said second photodiode being such that the dark current flowing through said first photodiode substantially flows through said second photodiode.

3. A combined optical power meter and receiver as in claim 2 wherein the value of the first reference voltage is $V_{REF}$, the value of the second reference voltage is ground, and the value of the third reference voltage is $2_{REF}$.

4. A combined optical power meter and receiver as in claim 2 further comprising a resistor interposed between said first photodiode and the current input of said first slow transimpedance amplifier, and a capacitor coupled between AC ground and the junction of said resistor and said first photodiode.

* * * * *

UNITED STATES PATENT AND TRADEMARK OFFICE
CERTIFICATE OF CORRECTION

PATENT NO. : 4,889,985
DATED : December 26, 1989
INVENTOR(S) : Bryan E. Allsop, Allen W. Mabbitt, Kevin K. Smith It is certified that error appears in the above-identified patent and that said Letters Patent is hereby corrected as shown below:

In claim 1, line 12, "slow" should read --second fast--.

Signed and Sealed this

Thirtieth Day of October, 1990

Attest:

HARRY F. MANBECK, JR.

*Attesting Officer*  *Commissioner of Patents and Trademarks*